US011530924B2

(12) United States Patent
Lee

(10) Patent No.: US 11,530,924 B2
(45) Date of Patent: Dec. 20, 2022

(54) APPARATUS AND METHOD FOR UPDATING HIGH DEFINITION MAP FOR AUTONOMOUS DRIVING

(71) Applicant: SK TELECOM CO., LTD., Seoul (KR)

(72) Inventor: Seongsoo Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 120 days.

(21) Appl. No.: 16/756,829

(22) PCT Filed: Nov. 15, 2018

(86) PCT No.: PCT/KR2018/014005
§ 371 (c)(1),
(2) Date: Apr. 16, 2020

(87) PCT Pub. No.: WO2019/139243
PCT Pub. Date: Jul. 18, 2019

(65) Prior Publication Data
US 2020/0249032 A1 Aug. 6, 2020

(30) Foreign Application Priority Data

Jan. 15, 2018 (KR) ........................ 10-2018-0005181
Aug. 21, 2018 (KR) ........................ 10-2018-0097468

(51) Int. Cl.
*G01C 21/32* (2006.01)
*G09B 29/00* (2006.01)
(Continued)

(52) U.S. Cl.
CPC ........... *G01C 21/32* (2013.01); *G05D 1/0274* (2013.01); *G09B 29/003* (2013.01); *G05D 1/0088* (2013.01); *G05D 2201/0213* (2013.01)

(58) Field of Classification Search
CPC .... G01C 21/32; G05D 1/0274; G05D 1/0088; G05D 2201/0213; G09B 29/003
See application file for complete search history.

(56) References Cited

U.S. PATENT DOCUMENTS

2006/0165276 A1* 7/2006 Hong .................. G05D 1/0274
382/153
2014/0300621 A1 10/2014 Kim
(Continued)

FOREIGN PATENT DOCUMENTS

CN 102194367 A 9/2011
CN 106097243 A 11/2016
(Continued)

OTHER PUBLICATIONS

International Search Report and Written Opinion, PCT Application No. PCT/KR2018/014005, dated Feb. 25, 2019, 14 pages (with English translation of International Search Report).
(Continued)

*Primary Examiner* — Rami Khatib
*Assistant Examiner* — Shahira Baajour
(74) *Attorney, Agent, or Firm* — Fenwick & West LLP

(57) ABSTRACT

A method for updating a high definition map according to one embodiment comprises: obtaining a two-dimensional image that captures a target area corresponding to at least a part of an area expressed by a three-dimensional high definition map, generating a three-dimensional local landmark map of the target area from a position of a landmark in the two-dimensional image, based on a position and an orientation of a photographing device which has captured the two-dimensional image and updating the high definition map with reference to the local landmark map corresponding to the target area of the three-dimensional high definition map.

13 Claims, 10 Drawing Sheets

(51) Int. Cl.
*G05D 1/02* (2020.01)
*G05D 1/00* (2006.01)

(56) References Cited

U.S. PATENT DOCUMENTS

2017/0192436 A1  7/2017  Min et al.
2018/0188037 A1* 7/2018  Wheeler ................. H04L 67/10

FOREIGN PATENT DOCUMENTS

| CN | 107462226 A    | 12/2017 |
| KR | 10-2015-0101009 A | 9/2015 |
| KR | 10-2017-0082165 A | 7/2017 |
| KR | 10-2017-0112862 A | 10/2017 |
| KR | 10-2017-0119010 A | 10/2017 |
| KR | 10-2017-0126909 A | 11/2017 |
| WO | 2016-130719 A2 | 8/2016 |

OTHER PUBLICATIONS

China National Intellectual Property Administration, Office Action, CN Patent Application No. 201880068940.0, Jun. 1, 2021, 21 pages.

* cited by examiner

APPARATUS AND METHOD FOR UPDATING HIGH DEFINITION MAP FOR AUTONOMOUS DRIVING

TECHNICAL FIELD

The present invention relates to an apparatus and a method for more efficiently updating a three-dimensional high definition map for autonomous driving. For reference, the present application claims a priority based on the Korean patent application (Application No. 10-2018-0005181) filed on Jan. 15, 2018 and a priority based on the Korean patent application (Application No. 10-2018-0097468) filed on Aug. 21, 2018. The entire contents of the application on which this priority is based are incorporated herein by reference.

BACKGROUND

In recent years, the autonomous driving technology has been spotlighted as the latest automobile technology. The autonomous driving means that a vehicle recognizes a road situation by itself and automatically runs without the driver's control of a brake, a steering wheel, an accelerator pedal, and the like. Such autonomous driving technology can be said to be a key technology for the implementation of a smart car.

For the autonomous driving, a three-dimensional digital map called a high definition map (abbreviated as HD map) needs to be provided. The high definition map may include lanes of a road on which the vehicle travels and additionally include the topographical features around the road such as a stop line, a sign, a traffic light, and a guardrail.

FIG. 1 is a view exemplarily illustrating a high definition map. The high definition map 1 can be generally generated using a three-dimensional point cloud data obtained while driving a real road with a mobile mapping system (MMS) vehicle equipped with a high definition sensor (RTK GPS, INS, LIDAR, etc.). However, in the case of the important information on driving of a vehicle, such as a lane, a stop line, a sign, a milestone, and the like, it may be expressed in detail in the form of a vector image. Referring to FIG. 1, the lane 2 expressed in the form of the vector image and the periphery 3 of the road expressed in the form of a point cloud can be identified.

A vehicle to which the autonomous driving technology is applied obtains information on the road currently being driven and the periphery of the road from the high definition map. However, the road and the periphery thereof may change from time to time due to changes in a construction or a traffic policy. In order to prevent accidents of the autonomous driving vehicle caused by referencing information different from the actual information, since such change in the information need to be reflected quickly and accurately in the high definition map, it can be said that an effective update of the high definition map is very important.

However, according to a method of generating the current high definition map, it is not easy to know where the above change has occurred in the area expressed by the high definition map, and even if the position where the change occurred has been found, the MMS vehicle equipped with the high definition sensor must travel around the position to perform the work that generates the high definition map around the position again. Such update method has a problem that it is not efficient in terms of time and effort.

SUMMARY

The problem to be solved by the present invention is to provide an apparatus and a method for enabling efficient update of a high definition map with less time and effort without using a high-performance equipment.

However, the problem to be solved by the present invention is not limited to those mentioned above and another problem that is not mentioned above can be clearly understood from the following description by a person who has an ordinary knowledge in the art to which the present invention belongs.

A method for updating a high definition map according to one embodiment comprises: obtaining two-dimensional image that captures a target area corresponding to at least a part of an area expressed by a three-dimensional high definition map, generating a three-dimensional local landmark map of the target area from a position of a landmark in the two-dimensional image, based on a position and an orientation of a photographing device which has captured the two-dimensional image and updating the high definition map with reference to the local landmark map corresponding to the target area of the three dimensional high definition map.

An apparatus 100 for updating a high definition map according to one embodiment comprises: photographing device 110 for acquiring a two-dimensional image that captures a target area corresponding to at least a part of the area expressed by a three-dimensional high definition map, a local landmark map generation unit 130 for generating a three-dimensional local landmark map of the target area from a position of a landmark in the two-dimensional image, based on a position and an orientation of the photographing device that has captured the two-dimensional image and an updating unit 140 for updating the high definition map with reference to the local landmark map corresponding to the target area of the high definition map.

According to an embodiment of the present invention, a normal vehicle having a general image photographing device such as a camera can easily detect occurrence in the change and update a high definition map using a two-dimensional image obtained through the image photographing device. Accordingly, it is not necessary to go through the process of generating the high definition map again using an expensive equipment for updating the existing high definition map, so that the update efficiency of the high definition map can be dramatically increased.

In addition, according to an embodiment of the present invention, as the high definition map can be easily updated by a normal vehicle having a camera, a large amount of data collected by numerous vehicles driving on the road can be secured to achieve a great effect in terms of not only economics but also reliability of the update.

DETAILED DESCRIPTION

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present invention, if it is determined that detailed description of related known components or functions unnecessarily obscures the gist of the present invention, the detailed description thereof will be omitted. Further, the terminologies to be described below are defined in consideration of the functions of the embodiments of the present invention and may vary depending on a user's or an operator's intention or practice. Accordingly, the definition thereof may be made on a basis of the content throughout the specification.

Figure 2A:
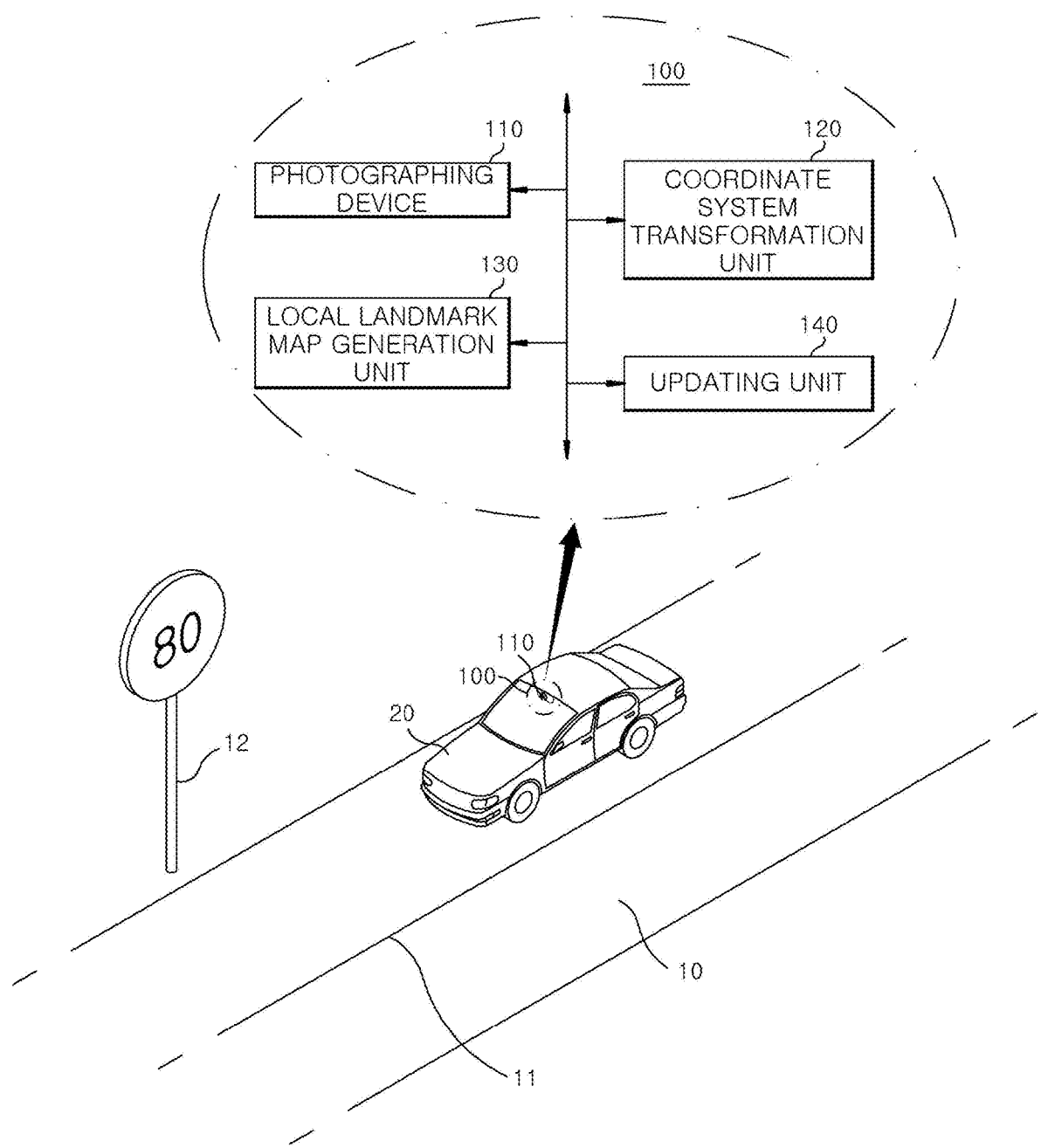
FIGS. 2A and 2B are views for illustrating a configuration of an apparatus for updating a high definition map according to various embodiments of the present invention.
Figure 2B:
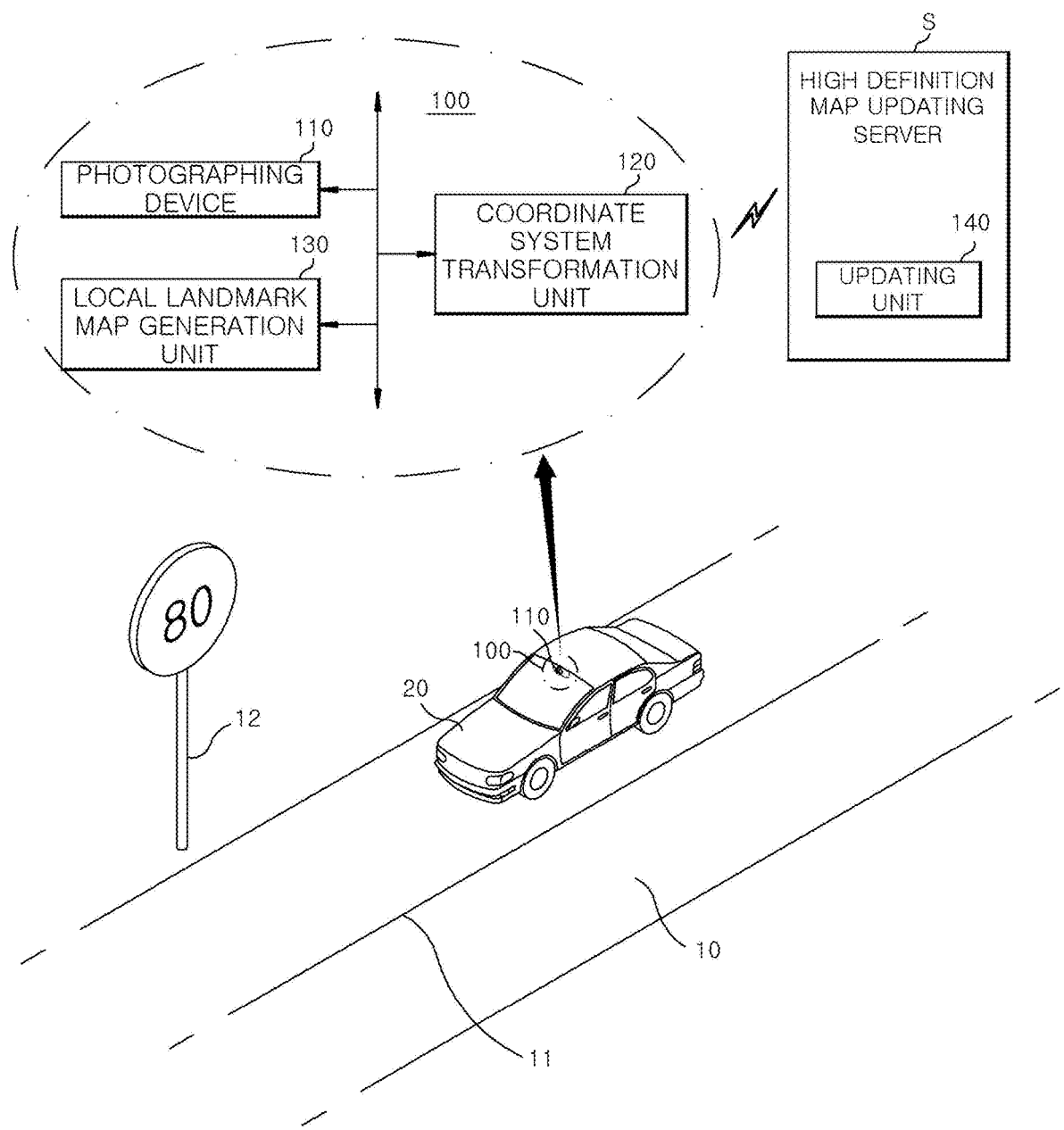

FIGS. 2A and 2B are views for illustrating a configuration of an apparatus for updating a high definition map according to various embodiments of the present invention. Referring to FIG. 2A, the apparatus 100 for updating the high definition map according to an embodiment of the present invention may comprise a photographing device 110, a coordinate system transformation unit 120, a local landmark map generation unit 130, and an updating unit 140. However, since the high definition map updating apparatus 100 of FIG. 2A is nothing but an embodiment of the present invention, the idea of the present invention is not limitedly construed by FIG. 2A.

As shown in FIG. 2A, the high definition map updating apparatus 100 may be mounted on a vehicle 20 traveling on a road 10. In some cases, unlike FIG. 2A, all or a part of the other constitutive elements except for the photographing device 110 may be installed in another place spaced apart from the vehicle 20. Referring to FIG. 2B, in the high definition map updating apparatus 100 according to another embodiment, the photographing device 110, the coordinate system transformation unit 120, and the local landmark map generation unit 130 are integrally formed and equipped on a plurality of vehicles 20, respectively, and the updating unit 140 implemented in a high definition map updating server S of the remote location may also use information transmitted from the high definition map updating apparatus 100 of each vehicle 20 to perform the update of the high definition map.

In this case, the constitutive elements spaced apart from each other among those of the high definition map updating apparatus 100 may transmit and receive data via wireless communication, and to this end, the high definition map updating apparatus 100 may further comprise a communication hardware for wireless communication.

As described above, the photographing device 110 may be an image photographing device, such as a general camera, capable of capturing a two-dimensional image, rather than a high-performance equipment for generating the high definition map. In addition, the vehicle 20 may also be a normal private vehicle or a commercial vehicle that comes into wide use, rather than the vehicle specifically prepared for generating the high definition map, such as an MMS vehicle.

The photographing device 110 may capture a target area corresponding to at least a part of the actual area expressed by the high definition map. Hereinafter, the two-dimensional image obtained by the capturing will be referred to as an "actual image". Referring to FIG. 2A, it can be seen that the actual image may be obtained by capturing the road 10 and the periphery area thereof as the target area with the photographing device 110 mounted on the vehicle 20. The actual image obtained thus may be a two-dimensional image in which a three-dimensional landscape is displayed in a plane.

Figure 1:
FIG. 1 is a view exemplarily illustrating a high definition map.

The surface of the road 10 may include a stop line, a lane, etc., including a center line 11, and various kinds of information display objects such as a traffic light, a milestone, a speed sign 12, and the like may exist in the periphery of the road 10. Such information necessary for driving the vehicle 20 may be referred to as a landmark, and the landmark may be expressed in the form of a vector image on the high definition map as shown in FIG. 1. Meanwhile, the landmarks on the road surface may be expressed in the form of lines, and the landmarks, which are the information display objects, may be expressed on the high definition map in the form of points.

The coordinate system transformation unit 120 may calculate the position and the orientation of the photographing device 110 at the time of point when the actual image is captured, based on the matching result between the high definition map already generated and the actual image. That is, the coordinate system transformation unit 120 may derive whether the photographing device 110 generates the same image as the actual image when the photographing device 110 captures the image in an arbitrary position and direction, and a concrete principle thereon will be described later. The coordinate system transformation unit 120 may be implemented to include a computing device such as a microprocessor, and this may be applied to the local landmark map generation unit 130 and the updating unit 140 which will be described later.

The local landmark map generation unit 130 may generate a three-dimensional local landmark map of the target area from visual information included in the actual image, based on the position and the orientation of the photographing device 110. Herein, the visual information included in the actual image may include position information of a landmark in the actual image. That is, the local landmark map generation unit 130 may generate a three-dimensional map of the same form as the high definition map from the two-dimensional actual image with respect to the target area that is captured as the actual image.

The updating unit 140 may update the high definition map by comparing the local landmark map with the portion corresponding to the target area of the high definition map. Detailed operation of the local landmark map generation unit 130 and the updating unit 140 will be described later.

Figure 3:
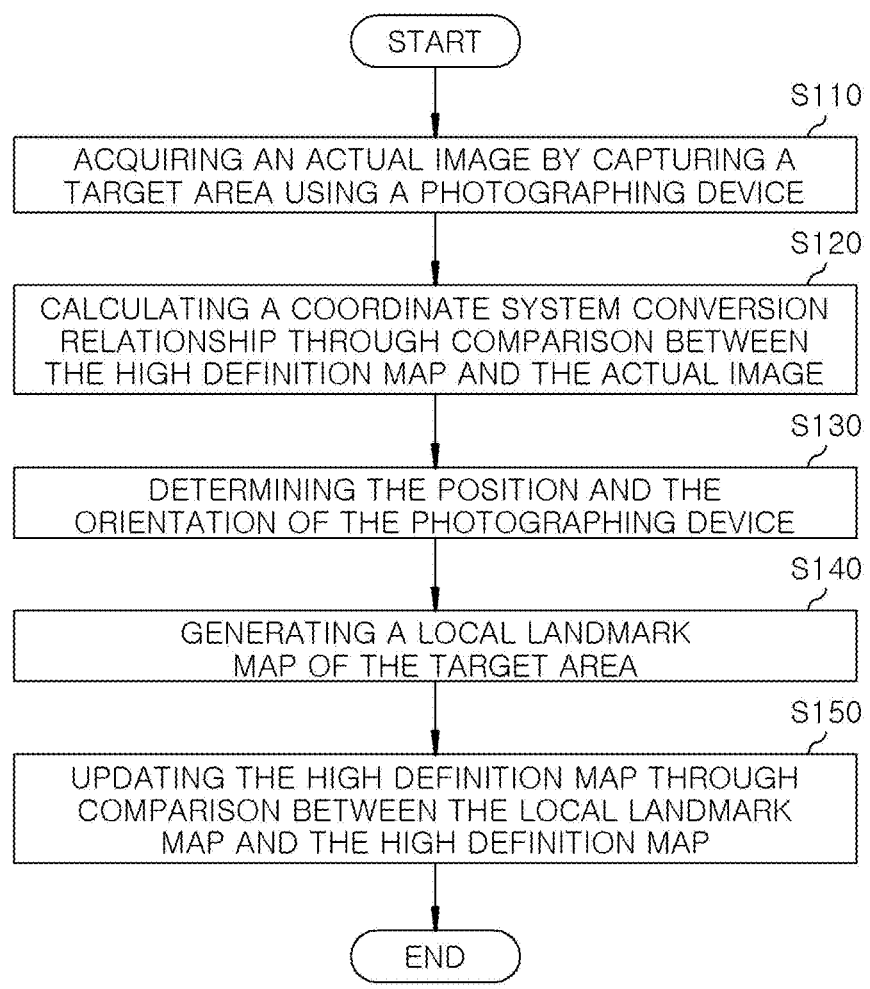
FIG. 3 is a view showing each of the steps constituting a method for updating a high definition map according to an embodiment of the present invention.

FIG. 3 is a view showing each of the steps constituting a method for updating a high definition map according to an embodiment of the present invention. The method of FIG. 3 may be performed using the high definition map updating apparatus 100 described with reference to FIG. 2, and a description of the overlapping portion of FIG. 2 may be omitted. However, since the method of FIG. 3 is merely an embodiment of the present invention, the spirit of the present invention is not construed to be limited by FIG. 3, and each step of the method of FIG. 3 may also be performed in a different order from that shown in FIG. 3.

First, the photographing device 110 may acquire an actual image by capturing a target area that is at least a part of the area expressed by the high definition map (S110). Next, a conversion relationship between the coordinate system of the high definition map and the coordinate system based on the photographing device 110 may be calculated through comparison between the high definition map and the actual image (S120). In order to set an area in the high definition map for comparing with the actual image, positioning means such as a GPS (global positioning system) may be used.

One of the key features of the present invention is to detect the position and the orientation of the photographing device 110 through matching between a three-dimensional high definition map data and a two-dimensional actual image data. This step S120 is directly related to such a key feature. Hereinafter, the concrete process of the step S120 will be described in more detail.

The coordinate system of the high definition map (hereinafter referred to as "first coordinate system") and the coordinate system based on the photographing device 110 (hereinafter referred to as "second coordinate system") may both be three-dimensional coordinate systems. The relationship between these two coordinate systems can be defined by a transformation matrix comprising a rotation component and a translation component. The equation for obtaining such a transformation matrix is shown in Equation 1 below, wherein T denotes a three-dimensional transformation matrix, and the right of the sigma (Σ) symbol defines a cost function of each of a plurality of landmarks detected from an actual image. That is, Equation 1 aims to obtain a transformation matrix T* that minimizes the sum of all the cost functions.

$$T^* = \underset{T}{\mathrm{argmin}} \sum_k \{Z_k - h(T, P_k)\}^T (C_{z_k} + HC_{P_k}H^T)^{-1}\{Z_k - h(T, P_k)\}$$

[Equation 1]

Herein, $Z_k$ refers to a coordinate value of the landmark such as a lane, a stop line, a sign, a milestone, a traffic light, a road marker, or the like, which is detected from the actual image. The landmark in the form of a point may have one coordinate value, but since the landmark in the form of a line may be expressed in the form of a set of a plurality of points, it may have a plurality of coordinate values corresponding to each of the plurality of points. $P_k$ means a coordinate value for a landmark on the high definition map and may correspond to $Z_k$. That is, in relation to the above coordinate value, the variable k means an index for distinguishing the cost function derived for each of the landmarks.

The function h refers to the function that, after the value of $P_k$ described by a first coordinate system is converted to the value of a second coordinate system using the transformation matrix T, the converted coordinate value is converted to the coordinate value projected onto a two-dimensional image by line of sight of the photographing device 110 using an internal parameter matrix of the photographing device 110. According to this, h (T, $P_k$) means a point in which $P_k$, a point on the first coordinate system, is moved into a two-dimensional actual image by the transformation matrix T. $C_{z_k}$ and $C_{p_k}$ refer to a covariance matrix indicating the distribution of $Z_k$ and $P_k$, respectively, and H means a partial differentiation (jacobian) for the function h. In general, T* in Equation 1 can be obtained by using a Gauss Newton algorithm or a Levenberg-Marquardt algorithm.

According to the generally known ICP (iterative closest point) algorithm, there exists two-point cloud sets that are intended to perform mutual matching. If one point of one set corresponds to one point of another set, the points with a Euclidean distance closest to each other correspond to each other.

Figure 4:
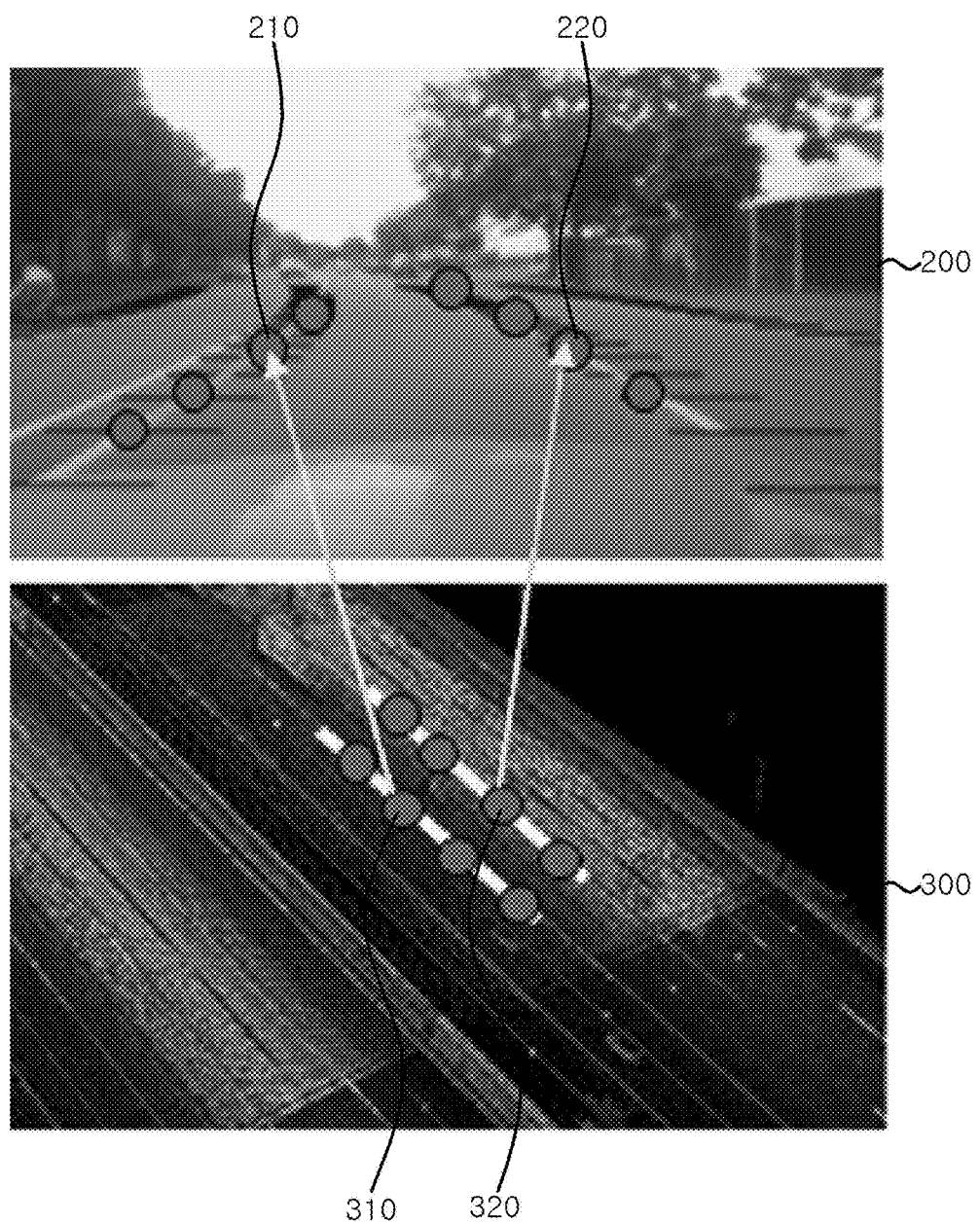
FIGS. 4 to 6 are views for illustrating a process of comparing a high definition map with an actual image in the method for updating the high definition map according to an embodiment of the present invention.

The present invention has been developed to convert the coordinates of points on a lane of the three-dimensional high definition map to the coordinates of the two-dimensional actual image reference using the transformation matrix described through Equation 1, and then to find the corresponding relationship between the points converted in the coordinates and the points in the actual image. By such a method, it can be seen that the corresponding relationship between the points 210 and 220 of the upper actual image 200 and the points 310 and 320 of the lower high definition map 300 in FIG. 4 can be established.

Once the corresponding relationship is determined, Equation 1 can be used to obtain the transformation matrix. In order to solve Equation 1, first, the initial value of the transformation matrix approximately estimated through GPS, IMU (Inertial Measurement Unit), etc. is input into Equation 1, and Equation 1 is repeatedly solved to update the transformation matrix. The process for updating the transformation matrix may be repeated until the change in the value of the transformation matrix is less than or equal to a certain level. Substantially, among several candidate transformation matrices, the minimum difference between the actual image and the image obtained by projecting on a two-dimensional plane the result of applying the candidate transformation matrix to the data in the high definition map may be significantly determined as the transformation matrix.

Figure 5:
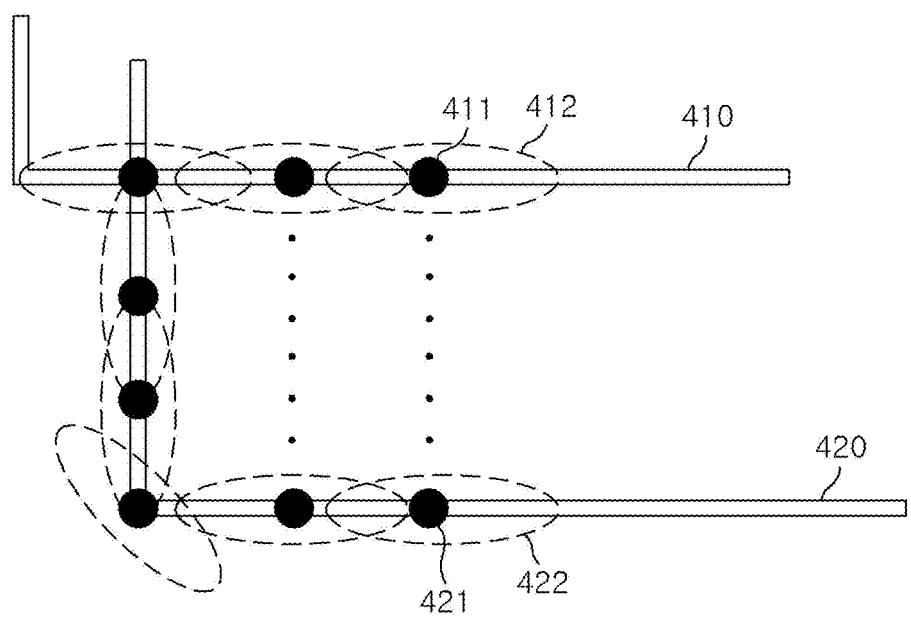

FIG. 5 is a view for illustrating an example in which two lines 410 and 420, such as a lane, correspond to point-to-point in more detail according to the present invention. Each point on the line 410 may correspond to any one of the points on another line 420. For example, the point 411 on the line 410 may correspond to the point 421 on the line 420.

In this case, calculation of the covariance component of Equation 1 can be more reasonably performed by calculating the covariance only with the coordinate values of the peripheral points within a certain distance from one point on the line, rather than calculating the covariance based on the coordinates of all the points on the line. In this case, the shapes 412 and 422 of the covariance matrix at each point will have an ellipse shapes in which the direction of the longer axis coincides with the direction of the line as shown in FIG. 5. This covariance calculation method can also be applied to a curve as well as a straight line.

On the other hand, a landmark in the form of a line may be strong in error in the direction perpendicular to the line due to the characteristics of the shape but be vulnerable in error in the direction parallel to the line. Such a problem may be complemented by a landmark in the form of a point expressed by a single point such as a milestone or a sign. Unlike the landmarks in the form of the line in which a large number of points can appear in the single line, the number of the landmarks in the form of points is small so that it is easier to find the corresponding relationship for mapping a point landmark in the actual image to a point landmark in the high definition map.

Accordingly, according to an embodiment of the present invention for the landmark in a point form, among the plurality of cases in which the landmark in the actual image is mapped one-to-one with the landmark in the high definition map, the corresponding relationship can be selected in the case in which the value of Equation 1 becomes minimum (that is the error due to matching is minimized).

Figure 6:
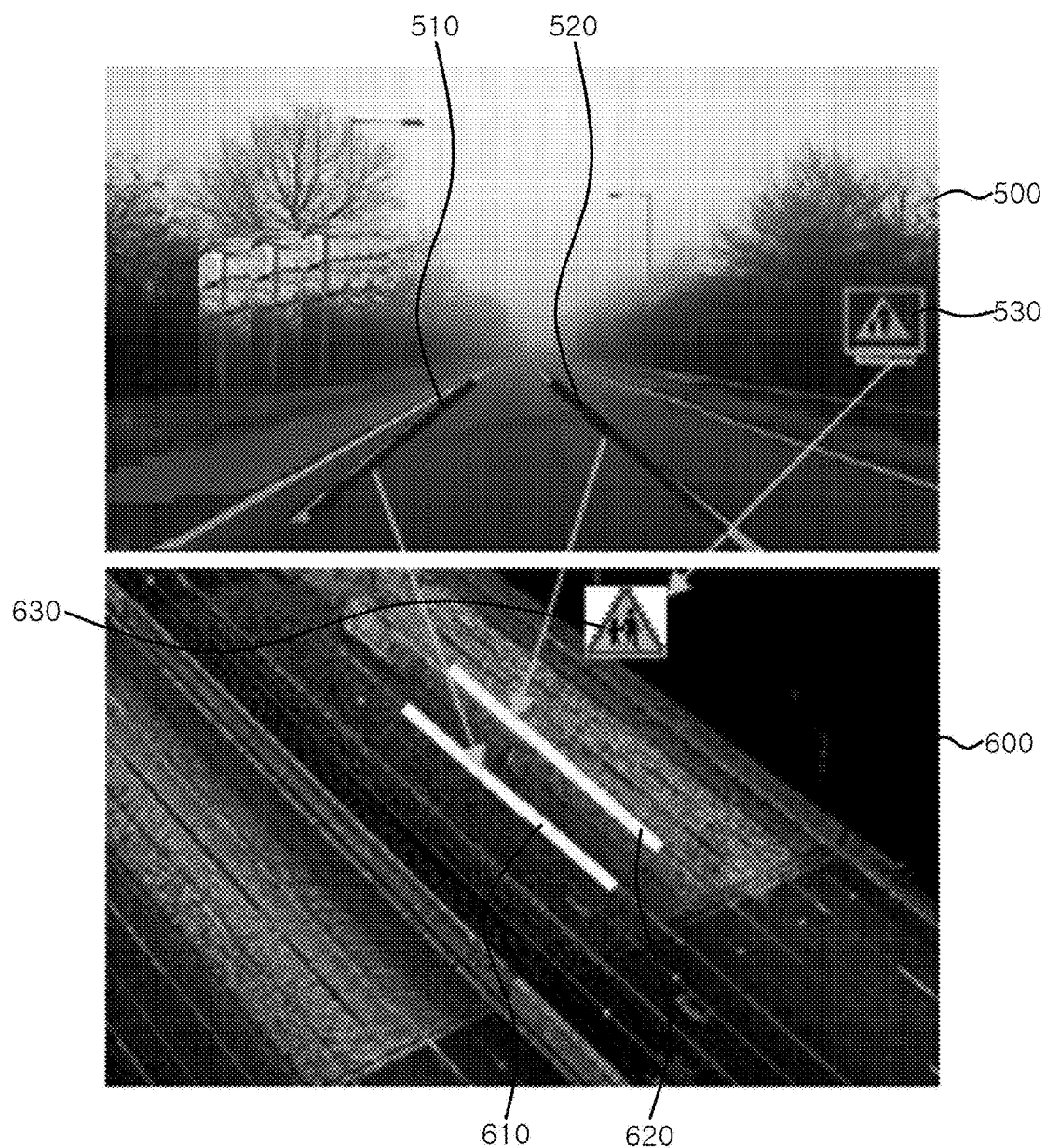

Referring to FIG. 6, it can be confirmed that matching between the actual image 500 and the high definition map 600 is performed using both the landmark in the form of a line and the landmark in the form of a point. According to this, the two lines 510 and 520 of the actual image 500 may correspond to the two lines 610 and 620 of the high definition map 600, respectively, and the sign 530 of the actual image 500 may correspond to the sign 630 of the high definition map.

Hereinafter, a method of correcting a value of the transformation matrix will be described in order to increase the accuracy of the transformation matrix obtained through the process illustrated above. First, the transformation matrix may be corrected using a dead reckoning and an algorithm for correcting the transformation matrix may be designed using driving information of a vehicle equipped with the photographing device 110. As the driving information, a wheel speed, a yaw rate, a steering angle, a gear signal, a signal from an IMU sensor, or the like may be used. Equation 2 to which a correction component that uses such a dead reckoning in Equation 1 above is added is as follows.

$$T^* = \underset{T}{\arg\min} \sum_k \{Z_k - h(T, P_k)\}^T (C_{z_k} + HC_{P_k}H^T)^{-1} \quad \text{[Equation 2]}$$
$$\{Z_k - h(T, P_k)\} + (T_{DR} - T)^T W_{DR}(T_{DR} - T)$$

In similarity to Equation 1, Equation 2 also defines a cost function for each landmark to the right of the sigma (Σ) symbol and is aimed to find a transformation matrix T* that minimizes a value of adding the "$(T_{DR}-T)^T W_{DR}(T_{DR}-T)$" cost function to the sum of the cost functions for all the landmarks. The term "$(T_{DR}-T)^T WDR(T_{DR}-T)$", the added portion compared to Equation 1, is related to the above correction, wherein the $T_{DR}$ means a three-dimensional transformation matrix indicating the position and the orientation of the photographing device 110 estimated by the dead reckoning and the $W_{DR}$ refers to a matrix for weighting.

Next, in a driving vehicle, a loop closing constraint condition, which is a method for correcting the value of the transformation matrix more accurately, will be described in case there is a result of calculating the transformation matrix for obtaining the position and the orientation of the photographing device 110 at least three times at different positions. In this case, it is premised that the photographing device 110 obtained the actual image three or more times at different positions in time order while the vehicle is driving, and that the transformation matrices based on the respective actual images were calculated. Then, among the three or more transformation matrices, the remaining transformation matrix may be corrected by using the most advanced transformation matrix and the latest transformation matrix in time.

Figure 7:
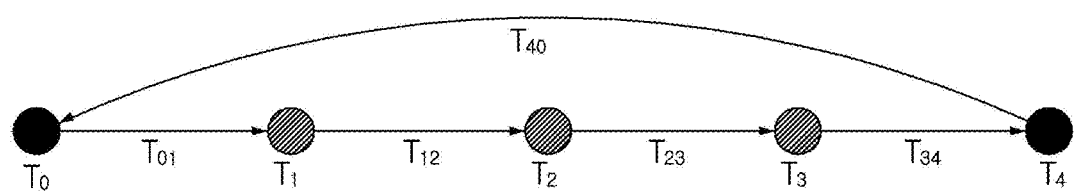
FIG. 7 is a view for illustrating a process of correcting a transformation matrix in the method for updating the high definition map according to an embodiment of the present invention.

The above correction method will be described in more detail with reference to FIG. 7. In the example of FIG. 7, it is assumed that a total of five transformation matrices of $T_0$, $T_1$, $T_2$, $T_3$, and $T_4$ have been obtained in time order, wherein $T_{ij}$ means relative transformation matrices between $T_i$ and $T_j$. In this case, while the values of the first $T_0$ and the last $T_4$ are fixed, the values of the remaining transformation matrices may be adjusted to satisfy Equation 3 below, wherein $C_{ij}$ is a covariance matrix indicating the deviation with respect to $T_{ij}$, and g is a function for predicting $T_{ij}$ by inputting $T_i$ and $T_j$.

$$\{T_0^*, \ldots, T_n^*\} = \underset{\{T_0, \ldots, T_n\}}{\arg\min} \sum_k \{T_{ij} - g(T_i, T_j)\}^T (C_{ij})^{-1} \{T_{ij} - g(T_i, T_j)\} \quad \text{[Equation 3]}$$

Returning to FIG. 3 again, if the transformation matrix is determined through the process as described above, the coordinate system transformation unit 120 may determine the position and the orientation of the photographing device 110 based on the value of the transformation matrix (S130). Then, the local landmark map generation unit 130 may generate a three-dimensional local landmark map of the target area from the information included in the actual image (S140), and the updating unit 140 may update the high definition map through comparison between the local landmark map and the portion corresponding to the target area in the high definition map (S150).

Hereinafter, the steps S140 and S150 will be described in more detail. The above-mentioned ICP algorithm, which is generally known, may be used for matching the local landmark map with the high definition map. Basically, the local landmark map may be substantially the same as the portion corresponding to the target area of the high definition map, but there may be a landmark that does not exist in the high definition map but exists only in the local landmark map. Such a landmark can be considered as a new landmark newly created between time of the point of generating the high definition map and time of the point of generating the local landmark map. On the other hand, there may be a landmark that exists in the high definition map but does not exist in the local landmark map, which can be considered as a deleted landmark removed between the time of the point of generating the high definition map and the time of the point of generating the local landmark map.

Since the actual image is a two-dimensional image, it is difficult to display a new landmark at an accurate position on the local landmark map using only one actual image. Accordingly, at least one of the position and the orientation of the photographing device 110 acquires a plurality of actual images different from each other and the position of the new landmark on the local landmark map may be determined using the position of the new landmark in each actual image. This will be described with reference to FIGS. 8A and 8B.

Figure 8A:
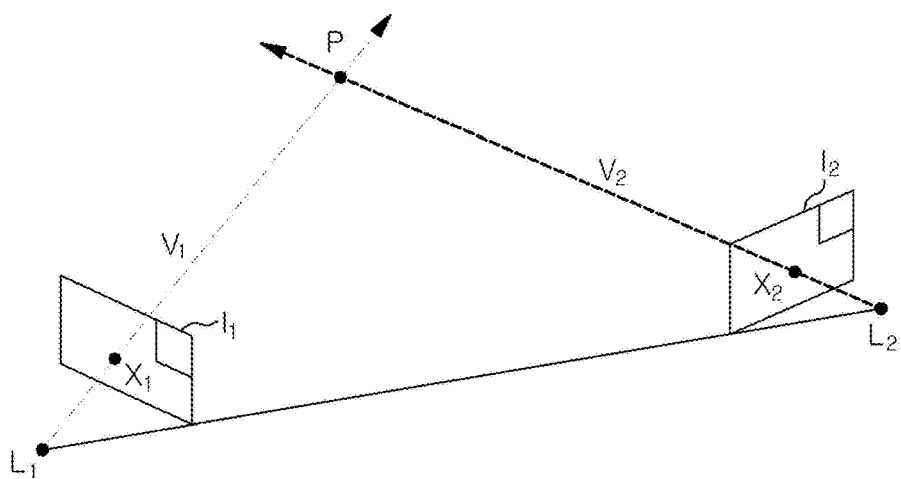
FIG. 8A is a view for illustrating a method for acquiring a three-dimensional position of a landmark using two images.
Figure 8B:
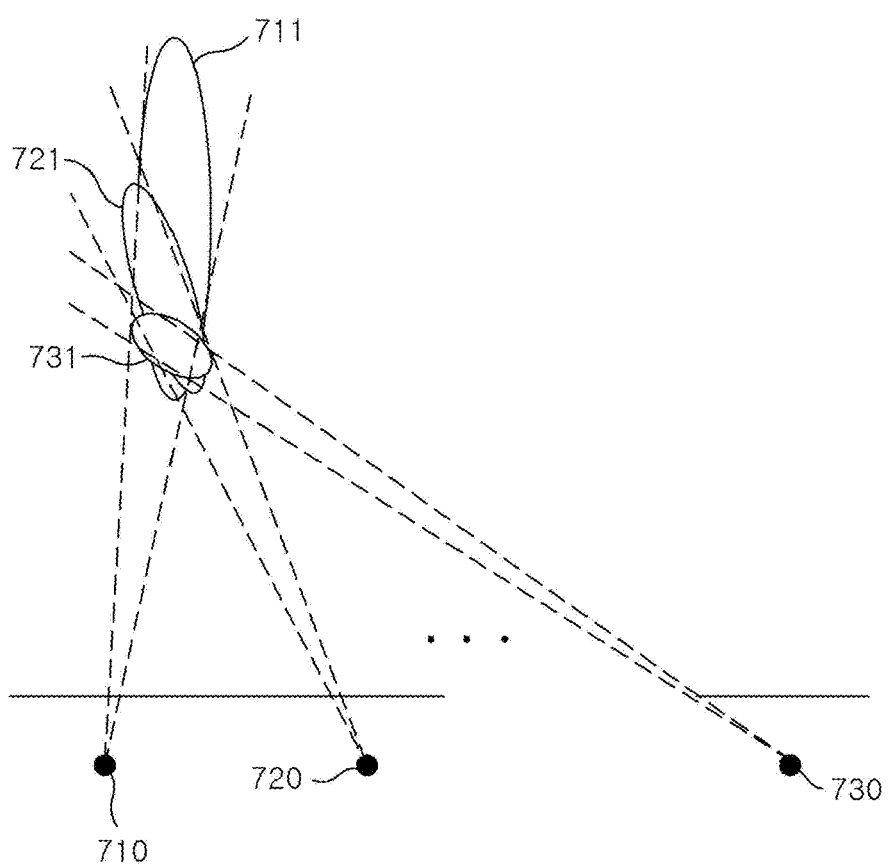
FIG. 8B is a view for illustrating a process of estimating a position of a new landmark in the method for updating the high definition map according to an embodiment of the present invention.

FIG. 8A is a view for illustrating a method for estimating a three-dimensional position of a landmark using two images, and FIG. 8B is a view for illustrating a process of estimating a position of a landmark in the method for updating the high definition map according to an embodiment of the present invention.

The local landmark map generation unit 130 according to an embodiment of the present invention may use a triangulation method for estimating a position of the landmark. Specifically, the local landmark map generation unit 130 identifies the same landmark in at least two images captured at different positions and applies the triangulation method to the identified result to estimate a three-dimensional position of the landmark on the local landmark map.

Referring to FIG. 8A, the photographing device 110 may acquire a first image $I_1$ by capturing a landmark at a first position $L_1$ and acquire a second image $I_2$ by capturing the landmark at a second position $L_2$. In this case, the local landmark map generation unit 130 may obtain a vector $V_1$ passing through a pixel $X_1$ corresponding to the landmark in the first image $I_1$ from the first position $L_1$ and obtain a vector $V_2$ passing through a pixel $X_2$ corresponding to the landmark in the second image $I_2$ from the second position $L_2$. Next, the local landmark map generation unit 130 may estimate the point where the vectors $V_1$ and $V_2$ intersect as a landmark position P in the three-dimensional space.

When estimating the position of the landmark by this method, the accuracy of the determined landmark position may be influenced by the number of the actual images that have identified the landmark. As described above, at least two actual images are used to estimate the position of the landmark in the three-dimensional space, and the measurement error can be reduced by estimating the average of the plurality of three-dimensional positions determined from the plurality of actual images as the landmark position in the three-dimensional space.

In addition, the farther the distance between the plurality of positions at which the plurality of actual images are captured by the photographing device 110, the higher the three-dimensional position accuracy of the landmark determined according to the above method. This is because the farther the distance between the photographing positions, the smaller the pixel error of the landmark identified in the actual image, whereby the three-dimensional position error of the landmark determined based on the above is also reduced. For example, in case the position error of a landmark in two actual images captured at two positions spaced 1 m apart is 1 pixel and the position error of the landmark in two actual images captured at two positions spaced 2 m apart is 1 pixel, the three-dimensional position of the landmark determined based on each of them has higher accuracy in the latter case.

In consideration of this, the local landmark map generation unit 130 may increase an accuracy of the landmark position and determine the landmark position to be provided to the updating unit 140 according to the accuracy. Providing the landmark position to the updating unit 140 based on the accuracy, that is, the error range will be described later.

Referring to FIG. 8B, an actual image may be captured at a plurality of positions 710, 720, and 730, respectively. It can be confirmed that the error range 711 of a landmark position estimated by the actual image captured at the first position 710 is relatively large, but the error range 721 of the landmark position estimated in consideration of the actual image at the second position 720 is smaller, and the error range 731 of the landmark position estimated in consideration of the actual image at the third position 730 is much smaller.

Later, when the updating unit 140 performs update of the high definition map, the updating unit 140 can update the high definition map by using only a landmark having such an error range (for example, covariance of the landmark position on the local landmark map, expressed in the form of a random variable) below a predetermined threshold value as a valid landmark.

Alternatively, the local landmark map generation unit 130 may estimate the landmark position and provide to the updating unit 140 only that the error range for the determined landmark position, that is, the covariance of the landmark position is less than or equal to the predetermined threshold value. According to the embodiment of FIG. 2A, the local landmark map generation unit 130 may provide only the landmark position having the covariance less than or equal to the predetermined threshold value to the updating unit 140 within the high definition map updating apparatus 100. Contrary to this, according to the embodiment of FIG. 2B, the local landmark map generation unit 130 may provide only the landmark position having the covariance less than or equal to the predetermined threshold value to an external high definition map updating server S through a communication means within the high definition map updating apparatus 100.

The position of a landmark on the local landmark map can be more accurately calculated using a Kalman Filter when the covariance is given. In this process, Equation 4 below may be used.

$$d = \lambda R^{-1} k^{-1} (u, v, 1)^T \quad \text{[Equation 4]}$$

Herein, d denotes a three-dimensional direction vector directing from the lens of the photographing device 110 to the position of the landmark, $\lambda$ is a constant for the purpose of normalization that makes $d=(a, b, c)^T$ as a unit vector, and R is a three-dimensional rotation matrix indicating the orientation of the photographing device 110. In addition, K denotes a calibration matrix related to internal parameters of the photographing device 110 that assumes a pin-hole model. Further, P* expressed as a three-dimensional coordinate can be obtained according to Equations (5) to (7) below.

$$P^* = A^{-1} b \quad \text{[Equation 5]}$$

$$A = \begin{pmatrix} \sum_i^n (1 - a_i^2) & -\sum_i^n a_i b_i & -\sum_i^n a_i c_i \\ -\sum_i^n a_i b_i & \sum_i^n (1 - b_i^2) & -\sum_i^n b_i c_i \\ -\sum_i^n a_i c_i & -\sum_i^n b_i c_i & \sum_i^n (1 - c_i^2) \end{pmatrix} \quad \text{[Equation 6]}$$

$$b = \begin{pmatrix} \sum_i^n [(1 - a_i^2) x_i - a_i b_i y_i - a_i c_i z_i] \\ \sum_i^n [-a_i b_i x_i + (1 - b_i^2) y_i - b_i c_i z_i] \\ \sum_i^n [-a_i c_i x_i - b_i c_i y_i + (1 - c_i^2) z_i] \end{pmatrix} \quad \text{[Equation 7]}$$

Herein, $(x_i, y_i, z_i)$ means an i-th position among the plurality of positions of the photographing device 110. A covariance of the three-dimensional position P of the landmark estimated based on the above Equation becomes $A^{-1}$, which indicates an error of the three-dimensional position of the landmark in the actual image captured at a first (i=1) photographing position.

Meanwhile, if a three-dimensional transformation matrix T is applied to the three-dimensional position P of the coordinate system reference landmark of the photographing device 110, a three-dimensional coordinate $P_W$ of the coordinate system reference landmark of the high definition map may be obtained. In this case, since the transformation matrix T has an error according to the position and the orientation of the photographing device 110, the local landmark map generation unit 130 may obtain a covariance $C_{pw}$ of the $P_W$ to which an error propagation concept is applied. The covariance $C_{pw}$ of the $P_W$ can be obtained according to Equation (8) below.

$$C_{Pw} = R \times A^{-1} \times R^T + J \times C_T \times J^T \quad \text{[Equation 8]}$$

Herein, R denotes a three-dimensional rotation matrix indicating the orientation of the photographing device 110, $C_T$ denotes a covariance for the transformation matrix T, and J denotes a partial differentiation (jacobian) for the function T×P.

In addition, the local landmark map generation unit 130 may identify an attribute of each landmark. Specifically, the local landmark map generation unit 130 extracts feature points in the actual image captured by the photographing device 110 to identify the attribute of the landmark and match the attribute with the three-dimensional position of the landmark whose attribute has been identified. In order to identify the attribute of the landmark, the local landmark map generation unit 130 may use a machine learning method such as a deep learning.

The local landmark map generation unit 130 may identify various attributes of the various objects existing in the driving environment as a landmark. For example, in case a traffic light is the landmark, the local landmark map generation unit 130 may identify a direction (horizontal or vertical) of the traffic light and the number of provided lights (2, 3, 4, etc.) as the attributes. Alternatively, in the case of a sign, the local landmark map generation unit 130 may identify the shape, type, purpose, etc. of the sign as the attributes.

If a three-dimensional position of the landmark, and a covariance and attribute thereof are identified according to the above-described process, the local landmark map generation unit 130 may provide the updating unit 140 with the three-dimensional position of the landmark, the covariance and attribute thereof. In this case, as described above, the local landmark map generation unit 130 of FIG. 2A may provide the landmark position, and the covariance and attribute thereof to the updating unit 140 within the high definition map updating apparatus 100, and the local landmark map generation unit 130 of FIG. 2B may provide the three-dimensional position of the landmark, the covariance and attribute thereof to the updating unit 140 of an external high definition map updating server S through a communication means within the high definition map updating apparatus 100.

Figure 9:
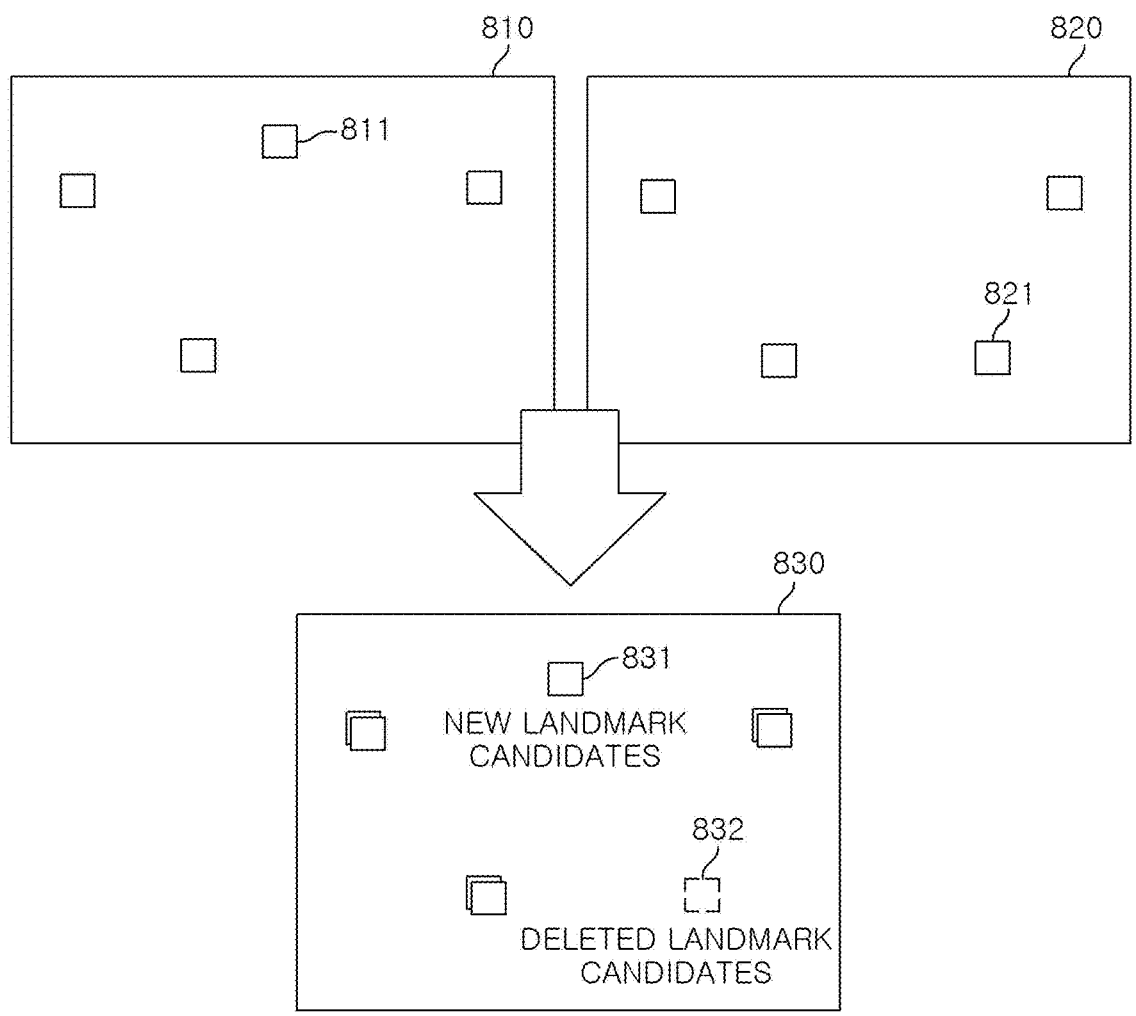
FIG. 9 is a view for illustrating a process of updating a high definition map through comparison with a local landmark map in the method for updating the high definition map according to an embodiment of the present invention.

FIG. 9 is a view for illustrating a process of updating the high definition map through comparison with a local landmark map in the method for updating the high definition map according to an embodiment of the present invention. The updating unit 140 may receive information about a landmark position, and a covariance and attribute thereof from the local landmark map generation unit 130. The reception may be performed with sampling of a certain time interval (e.g., 1 second) to reduce an amount of transmission data. The updating unit 140 may update the high definition map by using the received information. Such an update may be that a new landmark is added to the high definition map and a deleted landmark is removed from the high definition map.

In order to add the new landmark, the updating unit 140 may identify a corresponding landmark on the high definition map based on the position of the received landmark, and the covariance and attribute thereof. If the corresponding landmark on the high definition map is identified, the updating unit 140 may check whether the same landmark is based on the position of the received landmark and the distance between the new landmark and the corresponding landmark on the high definition map.

In this case, the updating unit 140 according to an embodiment may obtain a distance based on a probability by applying a Mahalanobis distance theory between the received landmark and the corresponding landmark on the high definition map. When the points $P_1$ and $P_2$ on two three-dimensional spaces have the covariances $C_1$ and $C_2$, respectively, the Mahalanobis distance $D_m$ follows Equation (9) below.

$$D_m = [P_1 - P_2]^T (C_1 + C_2)^{-1} [P_1 - P_2] \qquad \text{Equation 9}$$

The updating unit 140 may determine that the two landmarks are the same when the calculated Mahalanobis distance is less than or equal to a predetermined threshold value. On the other hand, if the corresponding landmark is not identified on the high definition map or if the Mahalanobis distance exceeds the predetermined threshold value, the updating unit 140 may determine the received landmark as a new landmark.

If the new landmark is determined, the updating unit 140 may update the high definition map by reflecting the new landmark on the high definition map. When the covariance of the determined new landmark position is less than or equal to a predetermined threshold value, the updating unit 140 according to an embodiment may add a weight average of the new landmark as its position to the high definition map, whereby it is possible to increase the reliability on the update of the high definition map.

Meanwhile, according to the embodiment of FIG. 2B, the updating unit 140 provided in the high definition map updating server S may receive information related to the same new landmark a plurality of times from a plurality of different high definition map updating apparatuses 100. In this case, the updating unit 140 may obtain a weight average of the plurality of new landmark positions received by reflecting the covariance. The updating unit 140 according to an embodiment may use a Kalman Filter to obtain the weight average of the received new landmark positions. By using the Kalman Filter to obtain the weight average of the new landmark positions sequentially in the order received, the computational speed can be increased and the storage space can be utilized more efficiently.

After obtaining the weight average, the updating unit 140 may determine whether to add the new landmark to the high definition map using the obtained weight average. The updating unit 140 according to an embodiment may add to the high definition map only the new landmark that is determined by a two-dimensional image having a predetermined threshold value or more among the new landmarks. That is, when the number of landmark information received from the local landmark map generation unit 130 and used to calculate the weight average is greater than or equal to the predetermined threshold value, the updating unit 140 may add a new landmark having the weight average as its position to the high definition map.

Contrary to this, when the covariance of a new landmark position obtained by the Kalman Filter is less than or equal to the predetermined threshold value, the updating unit 140 according to another embodiment may add the new landmark having the previously obtained weight average as its position to the high definition map. Through the above-described embodiments, the updating unit 140 may increase the reliability on the update of the high definition map by newly adding only a reliable landmark to the high definition map.

In addition, in order to remove the deleted landmark, the updating unit 140 may receive information indicating that a specific landmark has been deleted from the local landmark map generation unit 130. For example, the local landmark map generation unit 130 of FIG. 2A may compare the actual image captured by the photographing device 110 with the high definition map to determine a landmark that is not identified as a deleted landmark, and transmit this information to the updating unit 140 within the high definition map updating generation apparatus 100. Unlike this, the local landmark map generation unit 130 of FIG. 2B may use a communication means within the high definition map updating apparatus 100 to transmit the information about the deleted landmark as determined above to the updating unit 140 provided in the high definition map updating server S.

If the information on the deleted landmark is received, the updating unit 140 may update the high definition map based on the information. In detail, the updating unit 140 may remove the deleted landmark on the high definition map depending on the received information.

On the other hand, according to the embodiment of FIG. 2B, the updating unit 140 provided in the high definition map updating server S may receive information about the deleted landmark from the plurality of different high definition map updating apparatuses 100 a plurality of times. In this case, the updating unit 140 according to an embodiment may remove from the high definition map only the deleted landmark determined by the two-dimensional image having a predetermined threshold value or more among the deleted landmarks. That is, the updating unit 140 may remove the deleted landmark on the high definition map when the number of the same deleted landmark information as received is greater than or equal to a predetermined threshold value.

Meanwhile, the update of the high definition map may be automatically performed by the updating unit 140 as described above. However, it is also possible that, if the updating unit 140 provides an administrator with the information required for updating (that is, information on the new landmark and the deleted landmark), the administrator confirms the information and finally approve the update.

If the update is completed, the high definition map updating apparatus may perform a next update based on the updated high definition map. To this end, the updating unit 140 according to the embodiment of FIG. 2B may provide the high definition map updating apparatus 100 with the updated high definition map through a communication means of the high definition map updating server S.

According to an embodiment of the present invention described so far, the update efficiency of the high definition map can be dramatically increased, and a great effect can also be achieved in terms of the economics and reliability of the update.

The combinations of the respective sequences of a flow diagram attached herein may be carried out by computer program instructions. Since the computer program instructions may be executed by the processor of a general purpose computer, a special purpose computer, or other programmable data processing apparatus, the instructions, executed by the processor of the computer or other programmable data processing apparatus, create means for performing functions described in the respective sequences of the sequence diagram. The computer program instructions, in order to implement functions in a specific manner, may be stored in a computer-readable storage medium or a computer-useable storage medium for other programmable data processing apparatus, and the instructions stored in the computer-readable storage medium or the computer-useable storage medium may produce manufacturing items that include means for instructions to perform the functions described in the respective sequences of the sequence diagram. The computer program instructions may be loaded in a computer or other programmable data processing apparatus, and therefore, the instructions, which are a series of sequences executed in a computer or other programmable data processing apparatus to create processes executed by a computer to operate a computer or other programmable data processing apparatus, may provide operations for executing functions described in the respective sequences of the flow diagram.

Moreover, the respective block or the respective sequences may refer to two or more modules, segments, or codes including at least one executable instruction for executing a specific logic function(s). In some alternative embodiments, it is noted that the functions described in the sequences may be run out of order. For example, two consecutive sequences may be executed simultaneously or in reverse order according to the particular function.

The above description illustrates the technical idea of the present invention, and it will be understood by those skilled in the art to which this present invention belongs that various changes and modifications may be made without departing from the scope of the essential characteristics of the present invention. Therefore, the exemplary embodiments disclosed herein are not used to limit the technical idea of the present invention, but to explain the present invention, and the scope of the technical idea of the present invention is not limited by those embodiments. Therefore, the scope of protection of the present invention should be construed as defined in the following claims, and all technical ideas that fall within the technical idea of the present invention are intended to be embraced by the scope of the claims of the present invention.

INDUSTRIAL APPLICABILITY

According to an embodiment of the present invention, updating of the high definition map used for autonomous driving does not require to go through the existing process of generating the high definition map again using an expensive equipment for updating the high definition map, so that the update efficiency of the high definition map can be dramatically increased. In addition, since a large amount of data collected by a number of normal vehicles traveling on the road can be secured, whereby a great effect can be achieved in terms of not only economics but also reliability of the update.

What is claimed is:
1. A method for updating a three-dimensional high definition map, comprising the steps of:
receiving, from a photographing device, a plurality of two-dimensional images that capture a target area corresponding to at least a part of an area expressed by the three-dimensional high definition map, the plurality of two-dimensional images captured sequentially in a timed order at different positions;
determining orientations and the different positions of the photographing device in the three-dimensional high definition map by matching the three-dimensional high definition map and one or more of the plurality of two-dimensional images;
determining transformation matrices for each of the plurality of two-dimensional images, each of the transformation matrices representing conversion between a coordinate system of the three-dimensional high definition map and a coordinate system associated with the photographing device;
correcting, using latest one of the transformation matrices, the transformation matrices other than the latest one of the transformation matrices using covariance matrices indicating deviation with respect to relative transformation matrices between two of the determined transformation matrices;

generating a three-dimensional local landmark map of the target area from landmarks in the plurality of two-dimensional images using at least the corrected transformation matrices and the latest one of the transformation matrices;

updating the three-dimensional high definition map with reference to the three-dimensional local landmark map corresponding to the target area of the three-dimensional high definition map; and autonomously driving a vehicle equipped with the photographing device using the updated three-dimensional high definition map.

2. The method for updating the three-dimensional high definition map according to claim 1, wherein the different positions and orientations of the photographing device when capturing the plurality of two-dimensional images are determined using the determined transformation matrices.

3. The method for updating the three-dimensional high definition map according to claim 2, further comprising iteratively determining a candidate transformation matrix, for each of the determined transformation matrices.

4. The method for updating the three-dimensional high definition map according to claim 1, further comprising correcting using latest one of the transformation matrices most advanced in time, remaining ones of the transformation matrices other than the latest one of the transformation matrices based on driving information of the vehicle equipped with the photographing device.

5. The method for updating the high definition map according to claim 1, further comprising
estimating a position of at least one of the landmarks in the three-dimensional high definition map, based on the different positions and orientations of the photographing device corresponding to each of the plurality of two-dimensional images and a position of at least one of the landmarks in the plurality of two-dimensional images.

6. The method for updating the three-dimensional high definition map according to claim 5, further comprising:
identifying a same landmark of the landmarks in each of the plurality of two-dimensional images; and
estimating an intersection point of vectors passing from the different positions to pixels corresponding to the identified same landmark in each of the plurality of two-dimensional images, as a position of the identified same landmark in the high definition map.

7. The method for updating the three-dimensional high definition map according to claim 5, further comprising:
indicating the position of the at least one of the landmarks in the plurality of two-dimensional images in a form of a random variable, and
determining whether the at least one landmark is a new landmark not present in the three-dimensional high definition map, based on a distance according to the random variable between the at least one landmark on the high definition map; and
updating the three-dimensional high definition map to include the new landmark when covariance of the position of the landmark in the form of the random variable is less than or equal to a predetermined threshold value.

8. The method for updating the three-dimensional high definition map according to claim 1, wherein the three-dimensional high definition map is updated with a new landmark included in the two-dimensional image but not in the three-dimensional high definition map and the three-dimensional high definition map is updated to delete a landmark that is present in the three-dimensional high definition map but not in the two-dimensional images.

9. The method for updating the three-dimensional high definition map according to claim 8, wherein a position of the new landmark is determined as a weighted average of positions of the new landmark in the two-dimensional images using a Kalman filter.

10. A non-transitory computer-readable recording medium for storing a computer program, which is programmed to execute a method for updating a three-dimensional high definition map, comprising the steps of:
receiving, from a photographing device, a plurality of two-dimensional images that capture a target area corresponding to at least a part of an area expressed by the three-dimensional high definition map, the plurality of two-dimensional images captured sequentially in a timed order at different positions;

determining orientations and the different positions of the photographing device in the three-dimensional high definition map by matching the three-dimensional high definition map and one or more of the plurality of two-dimensional images;

determining transformation matrices for each of the plurality of two-dimensional images, each of the transformation matrices representing conversion between a coordinate system of the three-dimensional high definition map and a coordinate system associated with the photographing device;

correcting, using latest one of the transformation matrices, the transformation matrices other than the latest one of the transformation matrices using covariance matrices indicating deviation with respect to relative transformation matrices between two of the determined transformation matrices;

generating a three-dimensional local landmark map of the target area from landmarks in the plurality of two-dimensional images using at least the corrected transformation matrices and the latest one of the transformation matrices;

updating the three-dimensional high definition map with reference to the three-dimensional local landmark map corresponding to the target area of the three-dimensional high definition maps; and autonomously driving a vehicle equipped with the photographing device using the updated three-dimensional high definition map.

11. The computer-readable recording medium of claim 10,
wherein the different positions and orientations of the photographing device when capturing the plurality of two-dimensional images are determined using the determined transformation matrices.

12. The computer-readable recording medium of claim 10,
estimating a position of at least one of the landmarks in the three-dimensional high definition map, based on the different positions and orientations of the photographing device corresponding to each of the plurality of two-dimensional images and a position of at least one of the landmarks in the plurality of two-dimensional images.

13. The computer-readable recording medium of claim 10, wherein the three-dimensional high definition map is updated with a new landmark included in the two-dimensional image but not in the three-dimensional high definition map and the three-dimensional high definition map is updated to delete a landmark that is present in the three-dimensional high definition map but not in the two-dimensional images.

* * * * *